US012086584B2

(12) United States Patent
Yang et al.

(10) Patent No.: US 12,086,584 B2
(45) Date of Patent: Sep. 10, 2024

(54) APPARATUS FOR OPERATING OTA UPDATE FOR VEHICLE, AND METHOD THEREOF

(71) Applicants: Hyundai Motor Company, Seoul (KR); Kia Corporation, Seoul (KR)

(72) Inventors: Young Jee Yang, Gyeonggi-do (KR); Dong Youl Lee, Seoul (KR); Myeong Gyu Jeong, Seoul (KR); Yoon Sik Jung, Seoul (KR); Hak Jun Kim, Gyeonggi-do (KR); Hyeok Sang Jeong, Gyeonggi-do (KR); Jin Ah Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 87 days.

(21) Appl. No.: 17/878,333

(22) Filed: Aug. 1, 2022

(65) Prior Publication Data
US 2023/0066683 A1 Mar. 2, 2023

(30) Foreign Application Priority Data

Aug. 26, 2021 (KR) .......... 10-2021-0113333
Nov. 30, 2021 (KR) .......... 10-2021-0169157

(51) Int. Cl.
*G06F 8/65* (2018.01)
*H04L 67/00* (2022.01)
*H04L 67/12* (2022.01)

(52) U.S. Cl.
CPC ........... *G06F 8/65* (2013.01); *H04L 67/12* (2013.01); *H04L 67/34* (2013.01)

(58) Field of Classification Search
CPC ........... G06F 8/65; H04L 67/12; H04L 67/34
USPC ...................... 717/168–174, 68–74
See application file for complete search history.

(56) References Cited

U.S. PATENT DOCUMENTS

| | | | |
|---|---|---|---|
| 8,140,358 B1 * | 3/2012 | Ling ................. | G07C 5/008 340/439 |
| 9,443,358 B2 * | 9/2016 | Breed ................. | G06F 8/65 |
| 10,171,478 B2 * | 1/2019 | McCauley ............ | H04L 9/3247 |
| 10,447,483 B1 * | 10/2019 | Su ..................... | H04L 9/3226 |
| 10,474,450 B1 * | 11/2019 | Chim .................. | H04L 67/12 |
| 10,871,952 B2 * | 12/2020 | Wang .................. | H04L 63/061 |
| 10,942,725 B2 * | 3/2021 | Jayaraman ........... | H04W 4/50 |
| 11,281,455 B2 * | 3/2022 | Jeong .................. | H04L 67/34 |
| 11,301,238 B2 * | 4/2022 | Yeh ..................... | G06F 8/65 |
| 11,422,792 B2 * | 8/2022 | Brugman ............. | H04L 9/3247 |
| 11,611,477 B1 * | 3/2023 | Prilepov .............. | H04W 4/46 |
| 11,720,349 B2 * | 8/2023 | Fukuyo ............... | G06F 8/454 717/170 |

(Continued)

OTHER PUBLICATIONS

Mbakoyiannis et al, "Secure Over-the-air Firmware Updating for Automotive Electronic Control Units", ACM, pp. 174-181 (Year: 2019).*

(Continued)

*Primary Examiner* — Anil Khatri
(74) *Attorney, Agent, or Firm* — Fox Rothschild LLP (57) ABSTRACT

Embodiments of the present disclosure relate to an apparatus for operating an over-the-air (OTA) update for a vehicle including a generation device generating starting control information of the vehicle based on information about an OTA update of the vehicle and a transmission device transmitting the generated starting control information.

16 Claims, 7 Drawing Sheets

(56) References Cited

U.S. PATENT DOCUMENTS

| | | | |
|---|---|---|---|
| 11,907,697 B2* | 2/2024 | Harata | G06F 9/4401 |
| 11,977,877 B2* | 5/2024 | Paulraj | G06F 8/654 |
| 2020/0174778 A1* | 6/2020 | David | H04W 4/80 |

OTHER PUBLICATIONS

Plappert et al, "Secure and Lightweight Over-the-Air Software Update Distribution for Connected Vehicles", ACM, pp. 268-282 ( Year: 2023).*
He et al, "Securing Over-The-Air IoT Firmware Updates using Blockchain", ACM, pp. 1-8 (Year: 2019).*
Jaouhari, "Toward a Secure Firmware OTA Updates for constrained IoT devices", IEEE, pp. 1-6 (Year: 2022).*
Helmy et al, "Enhanced Multi-Level Secure Over-the-Air Update System using Adaptive Autosar", IEEE, pp. 1-4 (Year: 2023).*
Dhobi et al, "Secure Firmware Update over the Air Using Trust Zone", IEEE, pp. 1-4 (Year: 2019).*

* cited by examiner

| SITUATION | | <DRIVING CYCLE 1> | | | | | <DRIVING CYCLE 2> | | |
|---|---|---|---|---|---|---|---|---|---|
| SUCCESS | UPDATE START | UPDATE PROGRESS | UPDATE SUCCESS | | | Vehicle Sleep | IGN on(DRIVING IS POSSIBLE) | IGN Off | — |
| | | NO STARTING NO IG_ON | STARTING IS POSSIBLE | | | | STARTING IS POSSIBLE | STARTING IS POSSIBLE | |
| ROLLBACK SUCCESS | UPDATE START | UPDATE PROGRESS | RETRY UPDATE (FAILURE) | ROLLBACK PROGRESS | ROLLBACK SUCCESS | Vehicle Sleep | IGN on(DRIVING IS POSSIBLE) | IGN Off | UPDATE PROGRESS |
| | | NO STARTING NO IG_ON | NO STARTING NO IG_ON | NO STARTING NO IG_ON | STARTING IS POSSIBLE | | STARTING IS POSSIBLE | STARTING IS POSSIBLE | NO STARTING NO IG_ON |
| ROLLBACK FAILURE | UPDATE START | UPDATE PROGRESS | RETRY UPDATE (FAILURE) | ROLLBACK PROGRESS | ROLLBACK FAILURE | Vehicle Sleep | IGN on(DRIVING IS IMPOSSIBLE) | IGN Off | UPDATE PROGRESS |
| | | NO STARTING NO IG_ON | NO STARTING NO IG_ON | NO STARTING NO IG_ON | NO STARTING IG_ON IS POSSIBLE | | NO STARTING IG_ON IS POSSIBLE | IGN Off | NO STARTING NO IG_ON |
| UPDATE INTERRUPTION | UPDATE START | UPDATE PROGRESS | | | | | IGN on(DRIVING IS IMPOSSIBLE) | IGN Off | UPDATE PROGRESS |
| | | NO STARTING NO IG_ON | | | | | NO STARTING IG_ON IS POSSIBLE | NO STARTING IG_ON IS POSSIBLE | NO STARTING NO IG_ON |

FIG.6

APPARATUS FOR OPERATING OTA UPDATE FOR VEHICLE, AND METHOD THEREOF

CROSS-REFERENCE TO RELATED APPLICATION

This application is based on and claims under 35 U.S.C. § 119(a) the benefit of Korean Patent Application Nos. 10-2021-0113333 and 10-2021-0169157, filed in the Korean Intellectual Property Office on Aug. 26, 2021 and Nov. 30, 2021, the entire contents of which are incorporated herein by reference.

TECHNICAL FIELD

Embodiments of the present disclosure relates to an apparatus and method for operating an over-the-air (OTA) update for a vehicle.

BACKGROUND

Generally, when a vehicle's OTA update is performed, functions of the vehicle's controllers are limited, and thus the vehicle may provide only the limited functions to a driver. Accordingly, to ensure the safety of the driver (or a user), the starting of the vehicle may need to be turned off when the OTA update is performed. Accordingly, when the starting of the vehicle is not controlled before the OTA update is performed, only the limited functions may be provided, thereby threatening the safety.

Besides, the vehicle may include a plurality of controllers. There may be a controller, which performs a safety guarantee function of the vehicle, from among the controllers. There may be a controller independent of the safety guarantee function of the vehicle. Accordingly, there is a need to grasp functions of a controller. When an OTA update is not managed for each grasped function, it is impossible to perform efficient OTA update.

SUMMARY

An aspect of embodiments of the present disclosure provides an apparatus or method capable of controlling the starting of a vehicle in performing an OTA update of the vehicle.

An aspect of embodiments of the present disclosure provides an apparatus or method capable of managing an OTA update for each function of a controller of a vehicle in performing an OTA update of the vehicle.

The technical problems to be solved by embodiments of the present disclosure are not limited to the aforementioned problems, and any other technical problems not mentioned herein will be clearly understood from the following description by those skilled in the art to which embodiments of the present disclosure pertain.

According to an aspect of embodiments of the present disclosure, an apparatus for operating an over-the-air (OTA) update for a vehicle includes a generation device generating starting control information for individually controlling at least one of starting or ignition power of the vehicle based on information about an OTA update of the vehicle and a transmission device transmitting the generated starting control information.

Furthermore, according to embodiments, the OTA update may indicate one of a completed OTA update, an ongoing OTA update, or an interrupted OTA update.

Moreover, according to embodiments, the information about the OTA update may include at least one of first information indicating that the completed OTA update is successful, second information indicating that the completed OTA update for a first controller included in the vehicle has failed, third information indicating that the completed OTA update for a second controller included in the vehicle has failed, fourth information indicating that the ongoing OTA update is in progress, or fifth information indicating the interrupted OTA update.

Also, according to embodiments, the starting control information may include one of information indicating that the starting of the vehicle is not prohibited, information indicating that the starting of the vehicle is prohibited and the ignition power of the vehicle is prohibited to be turned on, or information indicating that the starting of the vehicle is prohibited and the ignition power is not prohibited to be turned on.

Besides, according to embodiments, the starting control information may include information indicating that the starting of the vehicle is not prohibited, in response to a fact that the information about the OTA update includes the first information or the second information.

In addition, according to embodiments, the starting control information may include information indicating that the starting of the vehicle is prohibited and the ignition power is not prohibited to be turned on, in response to a fact that the information about the OTA update includes the third information or the fifth information.

Furthermore, according to embodiments, the starting control information may include information indicating that the starting of the vehicle is prohibited and the ignition power of the vehicle is prohibited to be turned on, in response to the information about the OTA update includes the fourth information.

Moreover, according to embodiments, the information indicating that the starting of the vehicle is not prohibited, and the information indicating that the starting of the vehicle is prohibited and the ignition power is not prohibited to be turned on may be generated in response to a fact that the OTA update is completed, or the OTA update is interrupted.

Also, according to embodiments, the information indicating that the starting of the vehicle is prohibited and the ignition power of the vehicle is prohibited to be turned on may be generated in response to a fact that the OTA update is being performed.

Besides, according to embodiments, the OTA update may be performed in response to a fact that the ignition power of the vehicle is turned off, or whether the OTA update is interrupted may be determined in response to a fact that the ignition power is turned on.

According to an aspect of embodiments of the present disclosure, a method for operating an OTA update for a vehicle includes generating starting control information for individually controlling at least one of starting or ignition power of the vehicle based on information about an OTA update of the vehicle and transmitting the generated starting control information.

Furthermore, according to embodiments, the OTA update may indicate one of a completed OTA update, an ongoing OTA update, or an interrupted OTA update.

Moreover, according to embodiments, the information about the OTA update may include at least one of first information indicating that the completed OTA update is successful, second information indicating that the completed OTA update for a first controller included in the vehicle has failed, third information indicating that the completed OTA update for a second controller included in the vehicle has failed, fourth information indicating that the ongoing OTA update is in progress, or fifth information indicating the interrupted OTA update.

Also, according to embodiments, the starting control information may include one of information indicating that the starting of the vehicle is not prohibited, information indicating that the starting of the vehicle is prohibited and the ignition power of the vehicle is prohibited to be turned on, or information indicating that the starting of the vehicle is prohibited and the ignition power is not prohibited to be turned on.

According to embodiments, the starting control information may include information indicating that the starting of the vehicle is not prohibited, in response to a fact that the information about the OTA update includes the first information or the second information.

In addition, according to embodiments, the starting control information may include information indicating that the starting of the vehicle is prohibited and the ignition power is not prohibited to be turned on, in response to a fact that the information about the OTA update includes the third information or the fifth information.

Furthermore, according to embodiments, the starting control information may include information indicating that the starting of the vehicle is prohibited and the ignition power of the vehicle is prohibited to be turned on, in response to the information about the OTA update includes the fourth information.

Moreover, according to embodiments, the information indicating that the starting of the vehicle is not prohibited, and the information indicating that the starting of the vehicle is prohibited and the ignition power is not prohibited to be turned on may be generated in response to a fact that the OTA update is completed, or the OTA update is interrupted.

Also, according to embodiments, the information indicating that the starting of the vehicle is prohibited and the ignition power of the vehicle is prohibited to be turned on may be generated in response to a fact that the OTA update is being performed.

Besides, according to embodiments, the OTA update may be performed in response to a fact that the ignition power of the vehicle is turned off, or whether the OTA update is interrupted may be determined in response to a fact that the ignition power is turned on.

As discussed, the apparatus and methods suitably include use of a controller or processer.

In another aspect, vehicles are provided that comprise an apparatus and/or method as disclosed herein.

BRIEF DESCRIPTION OF THE DRAWINGS

The above and other objects, features and advantages of embodiments of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying drawings. In adding reference numerals to components of each drawing, it should be noted that the same components have the same reference numerals, although they are indicated on another drawing. In describing embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which embodiments of the present disclosure belong. It will be understood that terms used herein should be interpreted as having a meaning that is consistent with their meaning in the context of embodiments of the present disclosure and the relevant art and will not be interpreted in an idealized or overly formal sense unless expressly so defined herein.

Hereinafter, embodiments of the present disclosure will be described in detail with reference to FIGS. 1 to 5.

Figure 1:
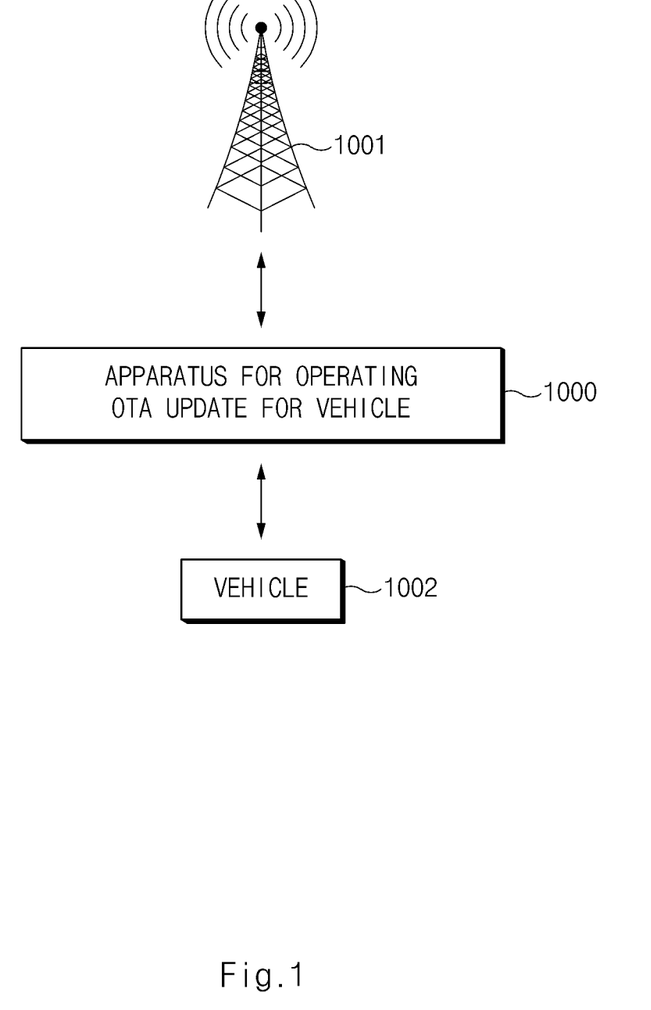
FIG. 1 illustrates an example of an environment, in which an apparatus for operating an OTA update for a vehicle is operated, according to embodiments.

FIG. 1 illustrates an example of an environment, in which an apparatus for operating an OTA update for a vehicle is operated, according to embodiments.

This drawing illustrates an example of an environment, in which an apparatus 1000 for operating an OTA update for a vehicle 1002 (or an apparatus) according to embodiments is operated.

The drawing illustrates that an apparatus may be located outside a vehicle. However, the apparatus may also be located inside the vehicle.

The vehicle according to embodiments may be a means of transportation for transporting a user (or a driver) and/or cargo on the ground. For example, the vehicle indicates an internal combustion engine vehicle, an electric vehicle (EV), a hybrid electric vehicle (HEV), a plug-in hybrid electric vehicle (PHEV), or a fuel cell electric vehicle (FCEV). The vehicle according to embodiments is not limited to the above-described example.

An OTA update according to embodiments may indicate a method for updating software of a vehicle over a wireless communication network.

In general, the software of a vehicle may be executed by connecting a storage device, in which data for updating the software may be stored, to the vehicle by wire. However, thanks to the development of communication technology, the vehicle may directly receive data required to update software over a wireless communication network and then may perform an update. The OTA update may refer to updating the vehicle's firmware over a wireless communication network (e.g., Wi-Fi) without connecting the vehicle to the above-described storage device (e.g., a computer). The firmware according to embodiments may correspond to the above-described software.

The OTA update according to embodiments may be called a firmware update of a vehicle, a firmware-over-the-air (FOTA) update, or a software update of the vehicle. The method for calling an OTA update is not limited to the above-described example.

The apparatus according to embodiments may receive information (or data necessary for the above-described software update) for an OTA update from a server 1001. According to embodiments, the information for an OTA update may refer to information for performing the above-described OTA update. For example, the information for an OTA update includes software package information, software version information, or vehicle identification number (VIN) information.

The apparatus according to embodiments may perform an OTA update of a vehicle based on the information for an OTA update received from the server. That is, the apparatus may perform the OTA update by comparing the information for an OTA update received from the server with information about software of a vehicle. For example, when software version information received from the server is different from software version information of a controller included in the vehicle, the apparatus determines to perform an OTA update.

The vehicle according to embodiments may include one or more controllers (electronic control units (ECUs)). The controller may indicate an electronic device that is included in the vehicle and performs a specific function. For example, the controller indicates an anti-lock braking system (ABS) controller, a traction control system (TCS) controller, a vehicle dynamic control (VDC) controller, a tire pressure monitoring system (TPMS) controller, an air flow sensor (AFS) controller, or a throttle position sensor (TPS) controller. The controller is not limited to the above-described example.

The OTA update according to embodiments may be performed for each of the above-described controllers. That is, the OTA update performed by the apparatus may be independently performed on each controller or may be performed collectively on all controllers included in the vehicle. For example, the apparatus may perform an OTA update on only the ABS controller included in the vehicle.

That is, the above-described software (or firmware) may be defined in units of controllers included in the vehicle or may be defined for all of a plurality of controllers included in the vehicle.

Through the OTA update described in this drawing, the apparatus according to embodiments may wirelessly update software (or firmware) of controller(s) included in the vehicle. That is, through update software of a controller in the above-described OTA scheme, the apparatus may add new functions of a controller, may improve existing errors, and/or may enhance security.

Figure 2:
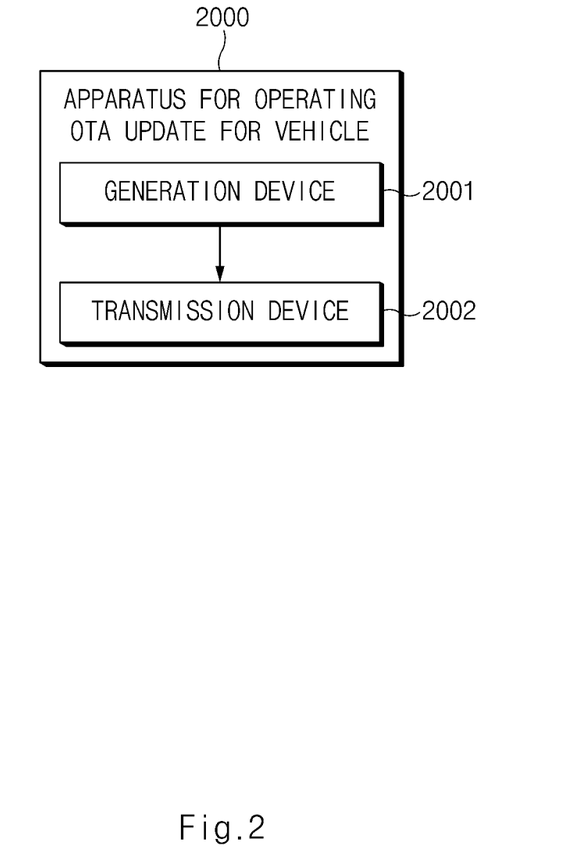
FIG. 2 illustrates an example of an apparatus for operating an OTA update for a vehicle, according to embodiments.

FIG. 2 illustrates an example of an apparatus for operating an OTA update for a vehicle, according to embodiments.

This drawing is a block diagram illustrating an example of an apparatus 2000 for performing an OTA update for a vehicle (the apparatus described above in FIG. 1), according to embodiments.

Generally, when a vehicle's OTA update is performed, functions of the vehicle's controllers are limited, and thus the vehicle may provide only the limited functions to a driver. Accordingly, to ensure the safety of the driver (or a user), the starting of the vehicle may need to be turned off when the OTA update is performed. Accordingly, when the starting of the vehicle is not controlled before the OTA update is performed, only the limited functions may be provided, thereby threatening the safety.

Besides, the vehicle may include at least a plurality of controllers. There may be a controller, which performs a safety guarantee function of the vehicle, from among the controllers. There may be a controller independent of the safety guarantee function of the vehicle. Accordingly, there is a need to grasp functions of a controller. When an OTA update is not managed for each grasped function, it is impossible to perform efficient OTA update.

An apparatus according to embodiments may control the starting of a vehicle in performing an OTA update of the vehicle. The apparatus according to embodiments may manage an OTA update for each function of a controller of a vehicle in performing an OTA update of the vehicle.

The apparatus for performing an OTA update for a vehicle according to embodiments may include a generation device 2001 and/or a transmission device 2002. The apparatus may further include one or more elements not shown in FIG. 1.

The generation device according to embodiments may generate starting control information of the vehicle, based on information about an OTA update of the vehicle. Here, the starting control information may individually control at least one of the starting or the ignition power of a vehicle.

The OTA update of the vehicle according to embodiments may indicate one of a completed OTA update, an ongoing OTA update, or an interrupted OTA update. That is, the starting control information may be generated in response to a fact that the OTA update is completed, may be generated while the OTA update is being performed, or may be generated in response to a fact that the OTA update is interrupted. The completed OTA update may include a successful update or a failed update.

The above-described failed update may indicate an update having all or part of update items that has not been updated unlike the originally intended OTA update. For example, the failed update indicates an update having an update item different from the originally intended OTA update item. The failed update is not limited to the above-described example. Moreover, the above-described interrupted update may include a state where the update is not completed due to an event occurring while an update is being performed. Here, the event may include the deterioration of a battery provided in a vehicle, the discharging of the battery, or the removal of the corresponding battery terminal.

As described above, the failed update or interrupted update may indicate that the originally intended OTA update is not performed. As a result, when the completed OTA update for the controller is a failed update or the OTA update for the corresponding controller is interrupted, the corresponding controller may fail to perform the originally designed function.

The information about the OTA update of a vehicle according to embodiments may include information about the completion of an OTA update for a controller, in which the above-described OTA update is performed, information about an ongoing OTA update, and/or information about the interruption of an OTA update.

For example, the information about an OTA update may include at least one of first information indicating that the completed OTA update is successful, second information indicating that the completed OTA update for a first controller included in a vehicle has failed, third information indicating that the completed OTA update for a second controller included in the vehicle has failed, fourth information indicating that the ongoing OTA update is in progress, or fifth information indicating the interrupted OTA update.

The starting control information of the vehicle according to embodiments may be information for controlling the starting of a vehicle. That is, the apparatus may turn on or off the vehicle's starting based on the generated starting control information of the vehicle. Also, the starting control information may include information for controlling the starting of the vehicle and/or information for controlling the ignition power of the vehicle.

For example, the starting control information may include one of information indicating that the vehicle's starting is not prohibited, information indicating that the vehicle's starting is prohibited, and the vehicle's ignition power is prohibited to be turned on, or information indicating that the vehicle's starting is prohibited and the ignition power is not prohibited to be turned on.

As described above, the starting control information may be generated based on at least one of the above-described first information, second information, third information, fourth information, or fifth information.

For example, the starting control information includes information indicating that the starting of the vehicle is not prohibited, in response to a fact that the information about the OTA update includes the first information or the second information. Moreover, the starting control information includes information indicating that the starting of the vehicle is prohibited and the ignition power is not prohibited to be turned on, in response to a fact that information about the OTA update includes the third information or the fifth information. Also, the starting control information includes information indicating that the starting is prohibited, and the ignition power of the vehicle is prohibited to be turned on, in response to the information about the OTA update includes the fourth information.

That is, the above-described information indicating that the vehicle's starting is not prohibited and the above-described information indicating that the vehicle's starting is prohibited, and the vehicle's ignition power is not prohibited to be turned on may be generated in response to a fact that an OTA update is completed, or an OTA update is interrupted. Furthermore, the above-described information indicating that the vehicle's starting is prohibited, and the vehicle's ignition power is prohibited to be turned on may be generated in response to a fact that an OTA update is being performed.

The transmission device according to embodiments may transmit the generated starting control information. In detail, the transmission device may transmit the generated starting control information to a controller that controls the starting (and/or ignition power) of the vehicle. The controller that controls the vehicle's starting (and/or ignition power) may control the vehicle's starting (and/or ignition power) based on the received starting control information.

In the meantime, the OTA update according to embodiments may be performed in response to a fact that the ignition power of the vehicle is turned off. The determination of whether the OTA update is interrupted may be performed in response to a fact that the ignition power is turned on.

An apparatus according to embodiments may generate the starting control information for individually controlling at least one of the starting or ignition power of a vehicle based on information about the vehicle's OTA update through the apparatus described in this drawing, and then may individually control at least one of the starting or the ignition power of the vehicle. In other words, the apparatus may generate the starting control information and then may control the starting of the vehicle in comprehensive consideration of a status of the vehicle's OTA update and/or a function of a controller performing an OTA update. That is, the apparatus may control the starting (and/or ignition power) of the vehicle based on the above-mentioned starting control information, thereby securing the safety of a vehicle driver.

Figure 3:
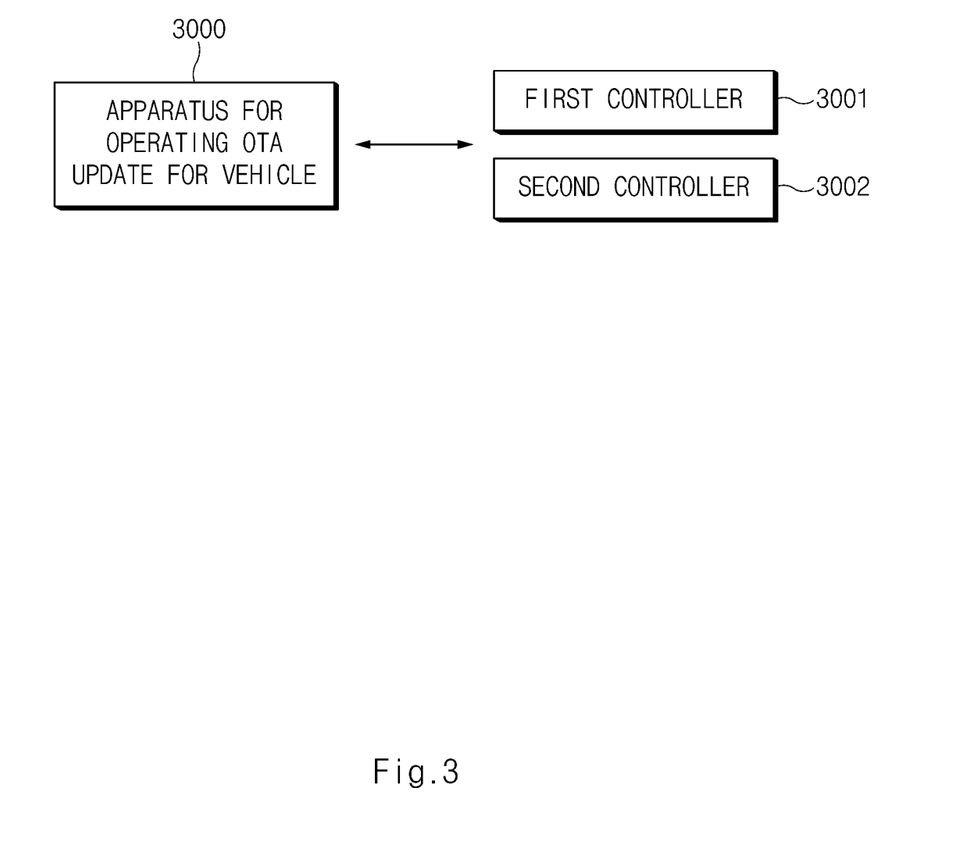
FIG. 3 illustrates an example of a first controller and a second controller, according to embodiments.

FIG. 3 illustrates an example of a first controller and a second controller, according to embodiments.

This drawing illustrates an example of a first controller 3001 and a second controller 3002 (the first controller and the second controller described in FIG. 2) according to embodiments.

As described above with reference to FIG. 1, an OTA update may be performed for each controller included in a vehicle. Moreover, as described above with reference to FIG. 2, an apparatus 3000 may control the starting of the vehicle by identifying an OTA update status for each controller on which the OTA update is performed.

As described above with reference to FIG. 2, the controller may indicate either the first controller or the second controller, which are to be described in this drawing. Furthermore, an OTA update performed in units of controllers may be completed in a failed state, or the OTA update may be interrupted. A controller on which an OTA update completed in a failed state has been performed or the OTA update has been interrupted may fail to perform the originally designed function.

The first controller and the second controller may be identified depending on the function of the corresponding controller. As described above with reference to FIG. 2, there may be a controller, which performs a safety guarantee function of the vehicle, from among a plurality of controllers included in the vehicle. Besides, there may be a controller, which performs a function irrelevant to the vehicle's safety guarantee function, from among a plurality of controllers.

Here, whether a plurality of controllers correspond to a controller related to a safety guarantee function or a controller irrelevant to a safety guarantee function may be defined in a package downloaded from the server described above in FIG. 1 and may be modified through a server interface depending on the type of vehicle, a driving environment, and whether there is a need for improvement/development of the vehicle.

The controller that performs a function irrelevant to the above-described safety guarantee function of a vehicle may correspond to the first controller. Moreover, the controller performing a function related to the above-described safety guarantee function of a vehicle may correspond to the second controller. For example, the first controller indicates an audio-video-navigation (AVN) controller, and the second controller indicates an ABS controller. The first controller and/or the second controller are not limited to the above-described examples.

Accordingly, the apparatus may treat a case where the OTA update for the first controller fails and a case where the OTA update for the second controller fails, differently from each other.

That is, even though the OTA update for the first controller has failed, the apparatus may not prohibit the starting of the vehicle. On the other hand, the apparatus may prohibit the starting of the vehicle when the OTA update for the second controller has failed.

An apparatus according to embodiments may generate the starting control information for individually controlling at least one of starting or ignition power of a vehicle based on information about the vehicle's OTA update through the apparatus described in this drawing, and then may individually control at least one of the starting or the ignition power of the vehicle. In other words, the apparatus may generate the starting control information and then may control the starting of the vehicle in comprehensive consideration of a status of the vehicle's OTA update and/or a function of a controller performing an OTA update. That is, the apparatus may control the starting (and/or ignition power) of the vehicle based on the above-mentioned starting control information, thereby securing the safety of a vehicle driver.

Figure 4A:
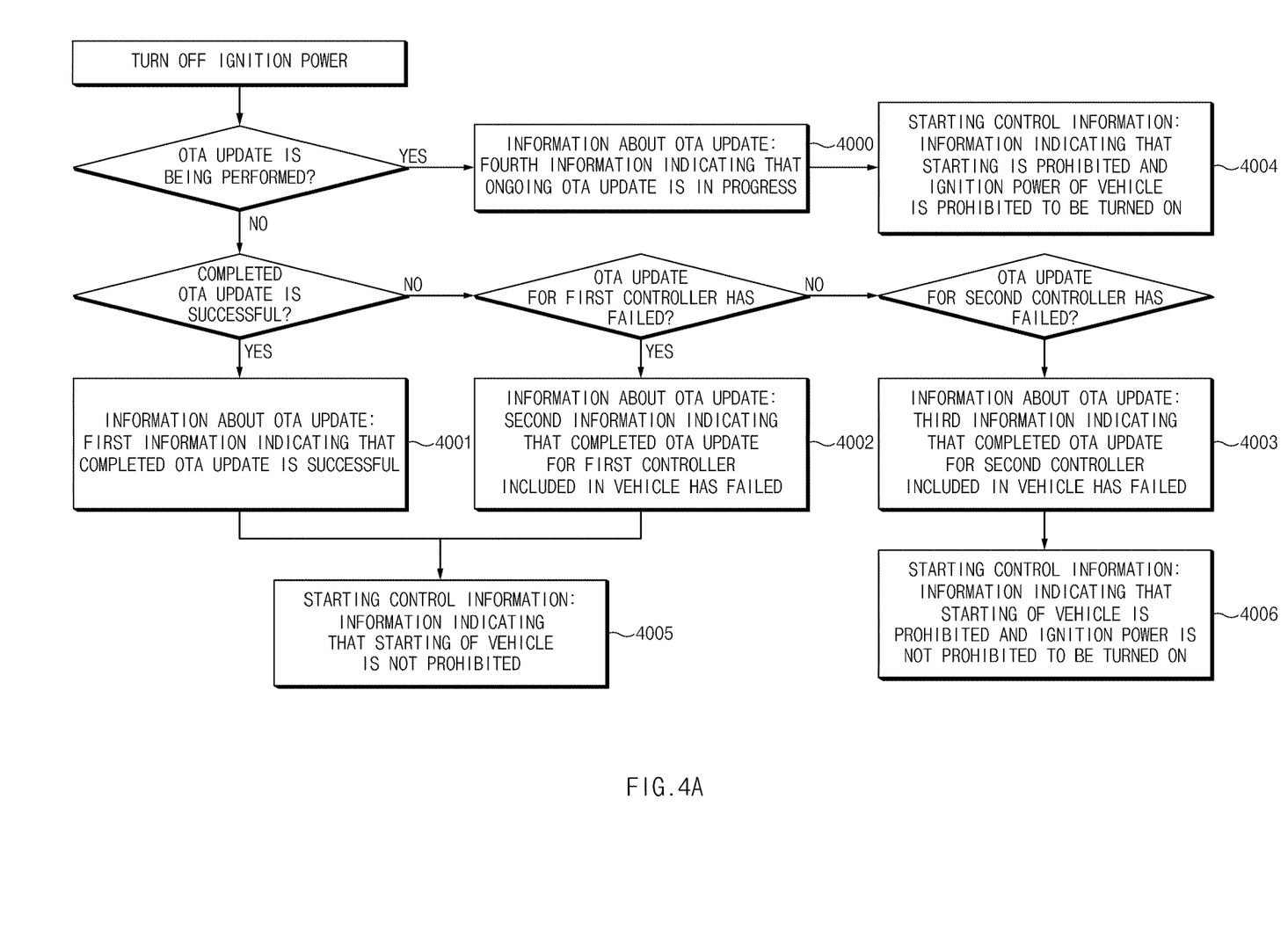
FIGS. 4A and 4B illustrate an example of a method for operating an OTA update for a vehicle, according to embodiments.
Figure 4B:
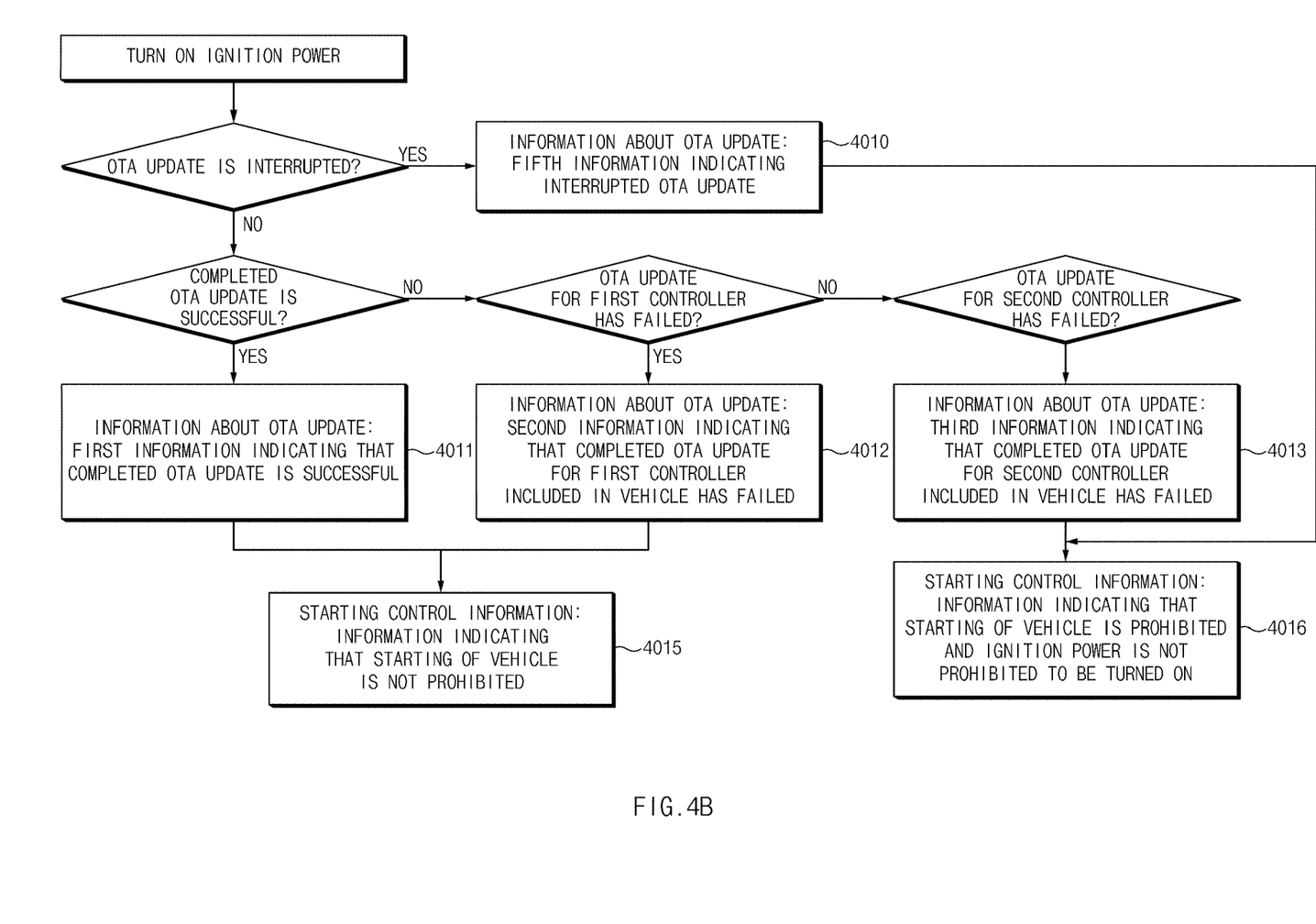

FIGS. 4A and 4B illustrate an example of a method for operating an OTA update for a vehicle, according to embodiments. In detail, FIG. 4A shows an example that proceeds when ignition power is turned off, and FIG. 4B shows an example that proceeds when the ignition power is turned on.

First of all, referring to FIG. 4A, this drawing illustrates an example, in which the ignition power is turned off in a method for operating an OTA update for a vehicle (or a method), according to embodiments.

The apparatus described above in FIGS. 1 to 3 may perform the method described in this drawing.

As described above, starting control information may be generated based on information about an OTA update.

Reference numerals 4000 to 4003 indicate information about an OTA update. Reference numerals 4004 to 4006 indicate the starting control information generated based on the information about the OTA update.

The information 4000 about an OTA update may include fourth information (the fourth information described above in FIG. 2) in response to a fact that the OTA update is being performed. The starting control information 4004 may include information indicating that the starting is prohibited, and the ignition power of the vehicle is prohibited to be turned on, in response to the information about the OTA update includes the fourth information.

The information 4001 about the OTA update may include first information (the first information described above with reference to FIG. 2) in response to a fact that an OTA update is not performed, and the completed OTA update indicates a successful update. Furthermore, the information 4002 about the OTA update may include second information (the second information described above with reference to FIG. 2) in response to a fact that the completed OTA update indicates a failed update, but the failed update is an OTA update for the first controller. The starting control information 4005 may include information indicating that the starting of a vehicle is not prohibited, in response to a fact that the OTA update includes the first information or the second information.

The information 4003 about the OTA update may include third information (the third information described above with reference to FIG. 2) in response to a fact that the completed OTA update indicates a failed update, but the failed update is an OTA update for the second controller. The starting control information 4006 may include information indicating that the starting of a vehicle is prohibited and the ignition power is not prohibited to be turned on, in response to a fact that the OTA update includes the third information.

This drawing illustrates that, before the apparatus determines whether the failed OTA update corresponds to the second controller, the apparatus first determines whether the failed OTA update corresponds to the first controller, in response to a fact that the completed OTA update indicates a failed update. However, the above-described identification order may be interchanged with each other. That is, the device may first determine whether the failed OTA update corresponds to the second controller, before the device may determine whether the failed OTA update corresponds to the first controller. As described above in FIG. 2, the second controller may correspond to a controller that performs the vehicle's safety guarantee function. The first controller may correspond to a controller that performs a function irrelevant to the vehicle's safety guarantee function. Accordingly, even though the vehicle's starting needs to be prohibited due to the failure of OTA update for the second controller, when the apparatus first determines whether the OTA update of the first controller has failed, data processing is not efficient in a starting control process.

Accordingly, to solve the above-described problems, the apparatus may determine whether the OTA update for the second controller has failed, before the apparatus may determine whether the OTA update for the first controller has failed. As such, the apparatus may reduce the data throughput in the starting control process by first determining whether the OTA update for a controller performing the vehicle's safety guarantee function has failed.

Next, referring to FIG. 4B, this drawing illustrates an example, in which the ignition power is turned on in a method for operating an OTA update for a vehicle (or a method), according to embodiments.

Likewise, the apparatus described above in FIGS. 1 to 3 may perform the method described in these drawings. As mentioned above, the starting control information may be generated based on information about an OTA update.

Reference numerals 4010 to 4013 indicate information about an OTA update. Reference numerals 4015 and 4016 indicate the starting control information generated based on the information about the OTA update.

First of all, when the ignition power is turned on, it may determine whether the OTA update has been interrupted. Here, the OTA update to be determined may include the OTA update performed in the previous cycle or the most recently performed OTA update based on the present when the ignition power is turned on. That is, a method of performing the OTA update for a vehicle according to embodiments may determine whether the OTA update performed in the previous cycle or the most recently performed OTA update has been completed or interrupted, in response to a fact that the ignition power is turned on.

The information 4010 about an OTA update may include fifth information (the fifth information described above in FIG. 2) in response to a fact that the OTA update is interrupted. The starting control information 4016 may include information indicating that the starting of the vehicle is prohibited and the ignition power is not prohibited to be turned on, in response to a fact that information about the OTA update includes the fifth information.

The information 4011 about the OTA update may include first information (the first information described above with reference to FIG. 2) in response to a fact that an OTA update is not interrupted, and the completed OTA update indicates a successful update. Furthermore, the information 4012 about the OTA update may include second information (the second information described above with reference to FIG. 2) in response to a fact that the completed OTA update indicates a failed update, but the failed update is an OTA update for the first controller. The starting control information 4015 may include information indicating that the starting of a vehicle is not prohibited, in response to a fact that the OTA update includes the first information or the second information.

The information 4013 about the OTA update may include third information (the third information described above with reference to FIG. 2) in response to a fact that the completed OTA update indicates a failed update, but the failed update is an OTA update for the second controller. The starting control information 4016 may include information indicating that the starting of a vehicle is prohibited and the ignition power is not prohibited to be turned on, in response to a fact that the OTA update includes the third information.

This drawing illustrates that, before the apparatus determines whether the failed OTA update corresponds to the second controller, the apparatus first determines whether the failed OTA update corresponds to the first controller, in response to a fact that the completed OTA update indicates a failed update. However, the above-described identification order may be interchanged with each other. That is, the device may first determine whether the failed OTA update corresponds to the second controller, before the device may determine whether the failed OTA update corresponds to the first controller. As described above in FIG. 2, the second controller may correspond to a controller that performs the vehicle's safety guarantee function. The first controller may correspond to a controller that performs a function irrelevant to the vehicle's safety guarantee function. Accordingly, even though the vehicle's starting needs to be prohibited due to the failure of OTA update of the second controller, when the apparatus first determines whether the OTA update of the first controller has failed, data processing is not efficient in a starting control process.

Accordingly, to solve the above-described problems, the apparatus may determine whether the OTA update for the second controller has failed, before the apparatus may determine whether the OTA update for the first controller has failed. As such, the apparatus may reduce the data throughput in the starting control process by first determining whether the OTA update for a controller performing the vehicle's safety guarantee function has failed.

In some embodiments, when the completed OTA update is not successful, the apparatus may determine whether the OTA update has failed for each and every controller. Based on the determination, the most comprehensive starting control information may be generated.

While FIGS. 4A and 4B describe embodiments where the vehicle includes two controllers, there may be more than two controllers in some embodiments.

An apparatus according to embodiments may generate the starting control information for individually controlling at least one of starting or ignition power of a vehicle based on information about the vehicle's OTA update through the method described in this drawing, and then may individually control at least one of the starting or the ignition power of the vehicle. In other words, the apparatus may generate the starting control information and then may control the starting of the vehicle in comprehensive consideration of a status of the vehicle's OTA update and/or a function of a controller performing an OTA update. That is, the apparatus may control the starting (and/or ignition power) of the vehicle based on the above-mentioned starting control information, thereby securing the safety of a vehicle driver.

Figure 5:
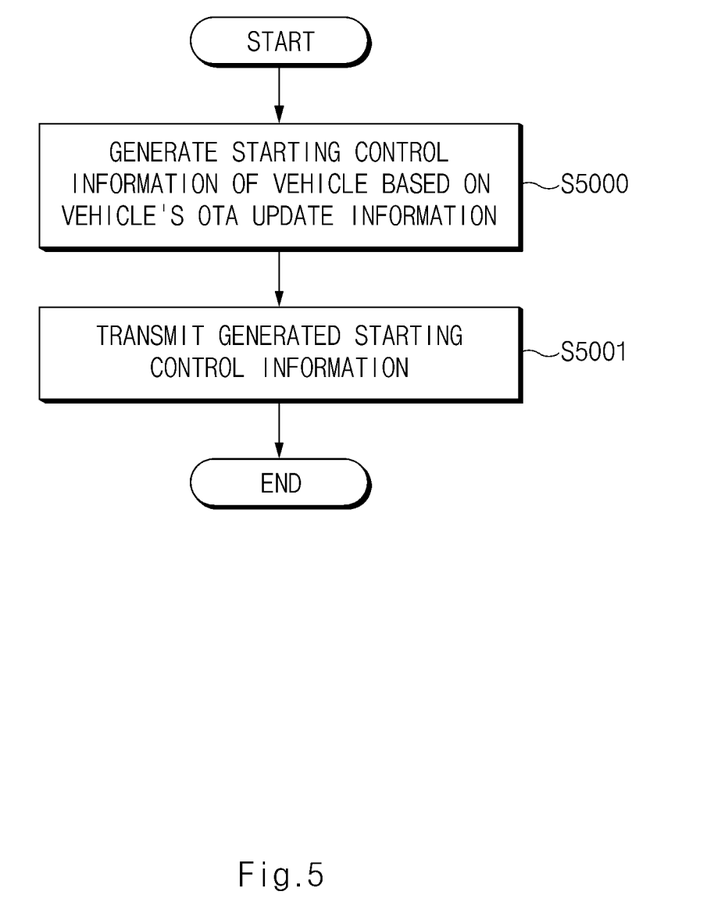
FIG. 5 illustrates an example of a method for operating an OTA update for a vehicle, according to embodiments.

FIG. 5 illustrates an example of a method for operating an OTA update for a vehicle, according to embodiments.

This drawing is a flowchart illustrating an example of a method for operating an OTA update for a vehicle (or a method) according to embodiments.

The apparatus described above in FIGS. 1 to 4 may perform the method described in this drawing.

The method for operating an OTA update for a vehicle may include step S5000 of generating starting control information for individually controlling at least one of the starting or ignition power of the vehicle based on the vehicle's OTA update information and step S5001 of transmitting the generated starting control information. The method may further include one or more steps not disclosed in this drawing.

The OTA update according to embodiments may indicate one of a completed OTA update, an ongoing OTA update, or an interrupted OTA update.

According to embodiments, the information about an OTA update may include at least one of first information indicating that the completed OTA update is successful, second information indicating that the completed OTA update for the first controller included in the vehicle has failed, third information indicating that the completed OTA update for the second controller included in the vehicle has failed, fourth information indicating that the ongoing OTA update is in progress, or fifth information indicating the interrupted OTA update.

The starting control information according to embodiments may include one of information indicating that the vehicle's starting is not prohibited, information indicating that the vehicle's starting is prohibited, and the vehicle's ignition power is prohibited to be turned on, or information indicating that the vehicle's starting is prohibited, and the ignition power is not prohibited to be turned on.

The starting control information according to embodiments may include information indicating that the starting of the vehicle is not prohibited, in response to a fact that the information about the OTA update includes the first information or the second information.

The starting control information according to embodiments may include information indicating that the starting of the vehicle is prohibited and the ignition power is not prohibited to be turned on, in response to a fact that information about the OTA update includes the third information or the fifth information.

The starting control information according to embodiments may include information indicating that the starting is prohibited, and the ignition power of the vehicle is prohibited to be turned on, in response to the information about the OTA update includes the fourth information.

According to various embodiments, the information indicating that the vehicle's starting is not prohibited and the information indicating that the vehicle's starting is prohibited, and the vehicle's ignition power is not prohibited to be turned on may be generated in response to a fact that an OTA update is completed, or an OTA update is interrupted.

According to embodiments, the information indicating that the vehicle's starting is prohibited, and the vehicle's ignition power is prohibited to be turned on may be generated in response to a fact that an OTA update is being performed.

The OTA update according to embodiments may be performed in response to a fact that ignition power of the vehicle is turned off. Whether the OTA update is interrupted may be determined in response to a fact that the ignition power is turned on. As described above, the detailed description of an OTA update, information about the OTA update, starting control information, first information, second information, third information, fourth information, and fifth information, information indicating that the vehicle's starting is not prohibited, information indicating that the starting is prohibited and the ignition power of the vehicle is prohibited to be turned on, and information indicating that the starting of the vehicle is prohibited and the ignition power of the vehicle is not prohibited to be turned on is the same as or similar to that described above with reference to FIGS. 1 to 4B.

An apparatus according to embodiments may generate the starting control information for individually controlling at least one of starting or ignition power of a vehicle based on information about the vehicle's OTA update through the method described in this drawing, and then may individually control at least one of the starting or the ignition power of the vehicle. In other words, the apparatus may generate the starting control information and then may control the starting of the vehicle in comprehensive consideration of a status of the vehicle's OTA update and/or a function of a controller performing an OTA update. That is, the apparatus may control the starting (and/or ignition power) of the vehicle based on the above-mentioned starting control information, thereby securing the safety of a vehicle driver.

Figure 6:
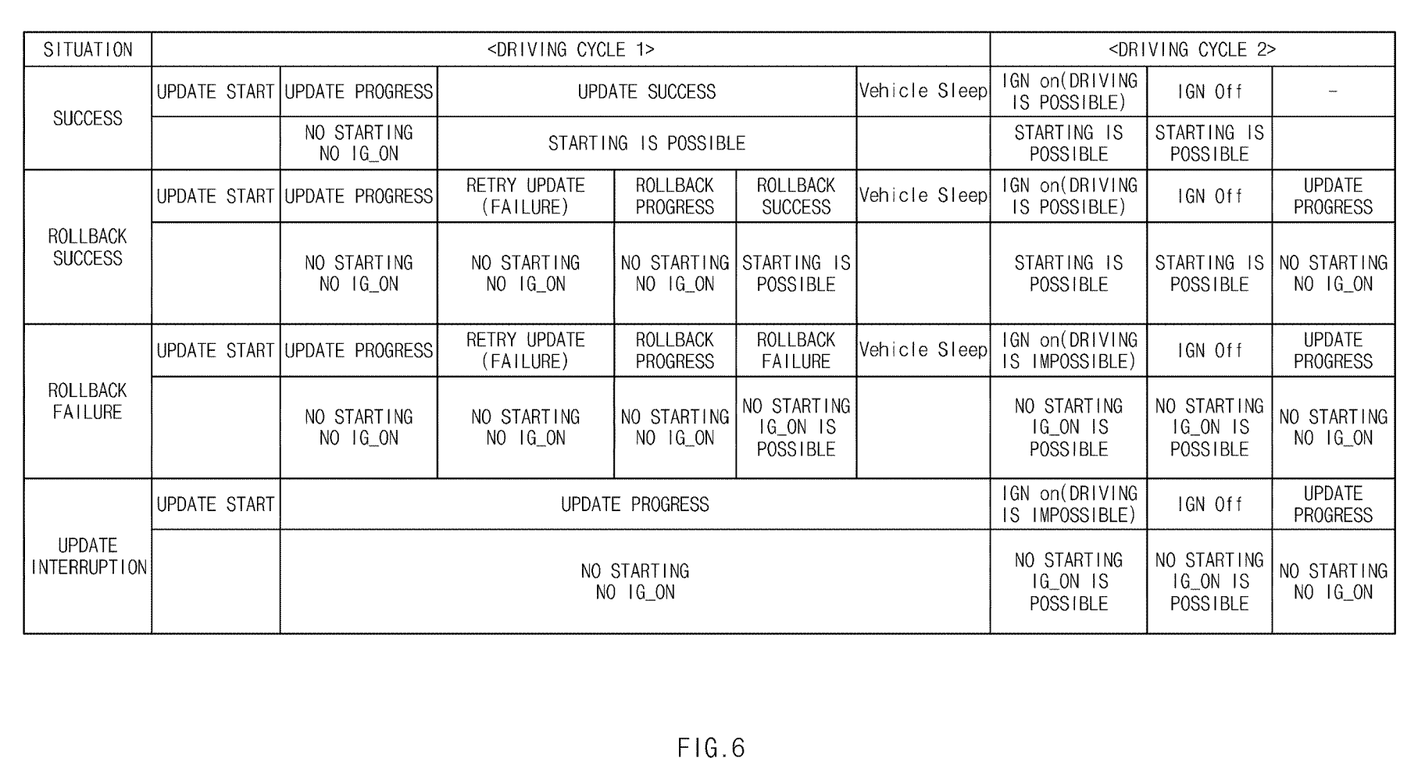
FIG. 6 illustrates an example of controlling at least one of starting or ignition power according to an update scenario generated in a method of performing an OTA update for a vehicle, according to embodiments.

FIG. 6 illustrates an example of controlling at least one of starting or ignition power according to an update scenario generated in a method of performing an OTA update for a vehicle, according to embodiments.

Referring to FIG. 6, an update scenario that occurs in an apparatus and method for performing an OTA update for a vehicle according to embodiments may include update success, rollback success, rollback failure, or update interruption. Moreover, each scenario may include at least two driving cycles such as a first driving cycle (Driving Cycle 1) and a second driving cycle (Driving Cycle 2).

First of all, referring to the scenario in which the update is successful, an update may be started, and the update may be in progress in the first driving cycle of the scenario in which the update is successful. Here, as described above, when an update is in progress, the starting of the vehicle may be prohibited and the ignition power of the vehicle may be prohibited to be turned on. When the update is successful, the starting of the vehicle may be possible, and the vehicle may be in a standby state (Vehicle Sleep) until the vehicle is driven.

Afterward, in the second driving cycle of the scenario in which the update is successful, the starting of the vehicle may be possible when the ignition power is turned on and off. Accordingly, the driving of the vehicle is also possible.

Next, referring to both a scenario where the rollback is successful and a scenario where the rollback fails, the update may be started in the first driving cycle of the scenario where the rollback is successful, and the update may fail when the update is performed or performed again. Here, as described above, when the update is performed or performed again, the starting of the vehicle may be prohibited and the ignition power of the vehicle may be prohibited to be turned on. When the update fails, the rollback may be in progress. As in an update process, while the rollback is in progress, the starting of the vehicle may be prohibited and the ignition power may be prohibited to be turned on. So far, the scenario where the rollback is successful may be the same as the scenario where the rollback fails.

Afterward, as in the scenario where the rollback is successful, when the rollback is successful, the starting of the vehicle may be possible. The vehicle may be in a standby state (Vehicle Sleep) until the vehicle is driven. Afterward, in the second driving cycle of the scenario in which the rollback is successful, the starting of the vehicle may be possible when the ignition power is turned on and off. Accordingly, the driving of the vehicle is also possible. Furthermore, when the driving of the vehicle is completed and the ignition power is turned off, as described above in FIG. 4A, the update may be in progress while the starting of a vehicle is prohibited and the ignition power is prohibited to be turned on.

In the meantime, as in the scenario where the rollback fails, when the rollback fails, the starting of the vehicle may be prohibited. However, the ignition power may not be prohibited to be turned on and the vehicle may be in a standby state (Vehicle Sleep) until the vehicle is driven. Afterward, even though the ignition power is turned on in the second driving cycle of the scenario in which the rollback has failed, the starting is impossible. Accordingly, the driving of the vehicle is also impossible. Furthermore, when the ignition power is turned off in a state where the starting of the vehicle is prohibited but the ignition power is not prohibited to be turned on, as described above in FIG. 4A, the update may be in progress while the starting of a vehicle is prohibited and the ignition power is prohibited to be turned on.

Finally, referring to the scenario in which the update is interrupted, an update may be started, and the update may be in progress in the first driving cycle of the scenario in which the update is interrupted. Here, as described above, when an update is in progress, the starting of the vehicle may be prohibited and the ignition power of the vehicle may be prohibited to be turned on. Here, as described above in FIG. 4B, when the update is interrupted, the vehicle may not be started. However, the ignition power may not be prohibited to be turned on.

Afterward, even though the ignition power is turned on in the second driving cycle of the scenario in which the update is interrupted, the starting is impossible. Accordingly, the driving of the vehicle is also impossible. Furthermore, when the ignition power is turned off in a state where the starting of the vehicle is prohibited but the ignition power is not prohibited to be turned on, as described above in FIG. 4A, the update may be in progress while the starting of a vehicle is prohibited and the ignition power is prohibited to be turned on.

Even though a situation such as update success, rollback success, rollback failure, or update interruption occurs, an apparatus and method according to embodiments may generate the starting control information for individually controlling at least one of the starting or ignition power of a vehicle based on information about the vehicle's OTA update and then may individually control at least one of the starting or ignition power of the vehicle through the scenario described in the drawings. In other words, the apparatus may generate the starting control information and then may control the starting of the vehicle in comprehensive consideration of a status of the vehicle's OTA update and/or a function of a controller performing an OTA update. That is, the apparatus may control the starting (and/or ignition power) of the vehicle based on the above-mentioned starting control information, thereby securing the safety of a vehicle driver.

The above description is merely an example of the technical idea of embodiments of the present disclosure, and various modifications and modifications may be made by one skilled in the art without departing from the essential characteristic of embodiments of the present disclosure.

Accordingly, embodiments of the present disclosure are intended not to limit but to explain the technical idea of embodiments of the present disclosure, and the scope and spirit of embodiments of the present disclosure is not limited by the above embodiments. The scope of protection of embodiments of the present disclosure should be construed by the attached claims, and all equivalents thereof should be construed as being included within the scope of embodiments of the present disclosure.

Embodiments may control the starting of a vehicle in performing an OTA update of the vehicle.

In addition, embodiments may manage an OTA update for each function of a controller of a vehicle in performing an OTA update of the vehicle.

Besides, a variety of effects directly or indirectly understood through the specification may be provided.

Hereinabove, although embodiments of the present disclosure has been described with reference to exemplary embodiments and the accompanying drawings, embodiments of the present disclosure is not limited thereto, but may be variously modified and altered by those skilled in the art to which embodiments of the present disclosure pertains without departing from the spirit and scope of embodiments of the present disclosure claimed in the following claims.

What is claimed is:

1. An apparatus for operating an over-the-air (OTA) update for a vehicle, the apparatus comprising:
    a generation device including a processor and configured to generate starting control information for controlling at least one of starting or ignition power of the vehicle based on information about an OTA update of the vehicle; and
    a transmission device including a transmitter and configured to transmit the generated starting control information;
    wherein the OTA update indicates one of a completed OTA update, an ongoing OTA update, or an interrupted OTA update;
    wherein the starting control information comprises one of:
        information indicating that the starting of the vehicle is not prohibited;
        information indicating that the starting of the vehicle is prohibited and the ignition power of the vehicle is prohibited to be turned on; or
        information indicating that the starting of the vehicle is prohibited and the ignition power is not prohibited to be turned on; and
    wherein the information indicating that the starting of the vehicle is not prohibited, and the information indicating that the starting of the vehicle is prohibited and the ignition power is not prohibited to be turned on, are generated in response to a fact that the OTA update is completed.

2. The apparatus of claim 1, wherein the information about the OTA update comprises at least one of:
    first information indicating that the completed OTA update is successful;
    second information indicating that the completed OTA update for a first controller included in the vehicle has failed;
    third information indicating that the completed OTA update for a second controller included in the vehicle has failed;
    fourth information indicating that the ongoing OTA update is in progress; or
    fifth information indicating the interrupted OTA update.

3. The apparatus of claim 2, wherein the starting control information comprises:
    information indicating that the starting of the vehicle is not prohibited, in response to a fact that the information about the OTA update comprises the first information or the second information.

4. The apparatus of claim 2, wherein the starting control information comprises:
    information indicating that the starting of the vehicle is prohibited and the ignition power is not prohibited to be turned on, in response to a fact that the information about the OTA update comprises the third information or the fifth information.

5. The apparatus of claim 2, wherein the starting control information comprises:
    information indicating that the starting of the vehicle is prohibited and the ignition power of the vehicle is prohibited to be turned on, in response to the information about the OTA update comprises the fourth information.

6. The apparatus of claim 1, wherein the ignition power is not prohibited to be turned on is further generated in response to a fact that the OTA is interrupted.

7. The apparatus of claim 1, wherein the information indicating that the starting of the vehicle is prohibited and the ignition power of the vehicle is prohibited to be turned on is generated in response to a fact that the OTA update is being performed.

8. The apparatus of claim 1, wherein the OTA update is performed in response to a fact that the ignition power of the vehicle is turned off, or whether the OTA update is interrupted is determined in response to a fact that the ignition power is turned on.

9. A method for operating an OTA update for a vehicle, the method comprising:
generating starting control information for controlling at least one of starting or ignition power of the vehicle based on information about an OTA update of the vehicle; and
transmitting the generated starting control information;
wherein the OTA update indicates one of a completed OTA update, an ongoing OTA update, or an interrupted OTA update; and
wherein the starting control information comprises one of:
information indicating that the starting of the vehicle is not prohibited;
information indicating that the starting of the vehicle is prohibited and the ignition power of the vehicle is prohibited to be turned on; or
information indicating that the starting of the vehicle is prohibited and the ignition power is not prohibited to be turned on; and
wherein the information indicating that the starting of the vehicle is not prohibited, and the information indicating that the starting of the vehicle is prohibited and the ignition power is not prohibited to be turned on, are generated in response to a fact that the OTA update is completed.

10. The method of claim 9, wherein the information about the OTA update comprises at least one of:
first information indicating that the completed OTA update is successful;
second information indicating that the completed OTA update for a first controller included in the vehicle has failed;
third information indicating that the completed OTA update for a second controller included in the vehicle has failed;
fourth information indicating that the ongoing OTA update is in progress; or
fifth information indicating the interrupted OTA update.

11. The method of claim 10, wherein the starting control information comprises:
information indicating that the starting of the vehicle is not prohibited, in response to a fact that the information about the OTA update comprises the first information or the second information.

12. The method of claim 10, wherein the starting control information comprises:
information indicating that the starting of the vehicle is prohibited and the ignition power is not prohibited to be turned on, in response to a fact that the information about the OTA update comprises the third information or the fifth information.

13. The method of claim 10, wherein the starting control information comprises:
information indicating that the starting of the vehicle is prohibited and the ignition power of the vehicle is prohibited to be turned on, in response to the information about the OTA update comprises the fourth information.

14. The method of claim 9, wherein the information indicating that the starting of the vehicle is not prohibited, and the information indicating that the starting of the vehicle is prohibited and the ignition power is not prohibited to be turned on are further generated in response to a fact that the OTA is interrupted.

15. The method of claim 9, wherein the information indicating that the starting of the vehicle is prohibited and the ignition power of the vehicle is prohibited to be turned on is generated in response to a fact that the OTA update is being performed.

16. The method of claim 9, wherein the OTA update is performed in response to a fact that the ignition power of the vehicle is turned off, or whether the OTA update is interrupted is determined in response to a fact that the ignition power is turned on.

* * * * *